United States Patent
Lee et al.

(10) Patent No.: US 8,366,560 B2
(45) Date of Patent: Feb. 5, 2013

(54) COUPLING DEVICE FOR COUPLING A ROTATING SHAFT AND A ROTATING MEMBER, AND ROTATING DEVICE USING THE SAME

(75) Inventors: Woo Sub Lee, Seoul (KR); Sung Chul Kang, Seoul (KR); Mun Sang Kim, Seoul (KR); Jun Ho Choi, Seoul (KR); Chang Mook Chun, Bucheon-si (KR)

(73) Assignee: Korea Institute of Science and Technology, Seoul (KR)

( * ) Notice: Subject to any disclaimer, the term of this patent is extended or adjusted under 35 U.S.C. 154(b) by 109 days.

(21) Appl. No.: 12/995,665

(22) PCT Filed: Jul. 22, 2008

(86) PCT No.: PCT/KR2008/004267
§ 371 (c)(1),
(2), (4) Date: Dec. 1, 2010

(87) PCT Pub. No.: WO2009/148201
PCT Pub. Date: Dec. 10, 2009

(65) Prior Publication Data
US 2011/0081976 A1    Apr. 7, 2011

(30) Foreign Application Priority Data

Jun. 2, 2008    (KR) .......................... 10-2008-0051457

(51) Int. Cl.
*F16D 3/12*    (2006.01)
(52) U.S. Cl. .......................................... 464/160; 901/28
(58) Field of Classification Search .................. 464/34, 464/35, 37, 160; 192/28; 901/28
See application file for complete search history.

(56) References Cited

U.S. PATENT DOCUMENTS

| | | | | |
|---|---|---|---|---|
| 1,119,938 A | * | 12/1914 | Dustin et al. | 464/37 X |
| 1,496,577 A | * | 6/1924 | Klausmeyer | 464/35 X |
| 4,848,547 A | | 7/1989 | Kampf | |
| 8,021,071 B2 | * | 9/2011 | Shim et al. | 464/34 X |
| 2010/0326227 A1 | * | 12/2010 | Choi et al. | |

FOREIGN PATENT DOCUMENTS

| | | | |
|---|---|---|---|
| DE | 10130520 A1 | 1/2003 | |
| GB | 661643 | * 11/1951 | ........ 464/37 |
| JP | 05-262022 A | 10/1993 | |
| JP | 06-014566 | 2/1994 | |
| JP | 2000-326253 A | 11/2000 | |
| JP | 2003-062768 A | 3/2003 | |
| JP | 2007-085421 A | 4/2007 | |

OTHER PUBLICATIONS

PCT International Search Report and Written Opinion, PCT/KR2008/004267, Feb. 17, 2009, 8 Pages.

* cited by examiner

*Primary Examiner* — Gregory Binda
(74) *Attorney, Agent, or Firm* — Fenwick & West LLP

(57) ABSTRACT

A coupling device has a flexible member that is vertically connected to a rotating shaft and of which the length can be varied in an inward and outward direction with respect to the rotating shaft, an elastic member that is connected to the flexible member and causes the flexible member to receive an elastic force in the outward direction with respect to the rotating shaft, and a cam member that is rotatably connected to the rotating shaft and delivers a rotating force of the rotating shaft to a rotating member. The cam member has a through-hole having an initial-position portion in which the flexible member is positioned at the initial stage and a displaced-position portion which has a smaller diameter than the initial-position portion and of which the diameter is constant about the rotating shaft, and an another through-hole having an initial-position portion in which the flexible member is positioned and a return-position portion of which the radius decreases from the initial-position portion.

12 Claims, 8 Drawing Sheets

COUPLING DEVICE FOR COUPLING A ROTATING SHAFT AND A ROTATING MEMBER, AND ROTATING DEVICE USING THE SAME

TECHNICAL FIELD

The present invention relates to a coupling device for coupling a rotating shaft and a rotating member, and a rotating device using the same, and more particularly to a coupling device, which generates a rotational displacement to protect a rotating device, when an external force equal to or greater than predetermined torque is applied to a rotating member of a rotating device such as a joint of a robot manipulator, and returns to the initial position when the external force is eliminated, and a rotating device using the same.

BACKGROUND ART

In general, a rotating device such as a joint of a robot manipulator includes a driving unit such as a driving motor, a rotating shaft which is connected to the driving unit so as to deliver a rotating force, and a rotating member which is connected to the rotating shaft so as to rotate.

The rotating member is rotated about the rotating shaft by the rotating device, and a variety of operations are performed by the rotation of the rotating member.

In general, a rotating device such as a joint of a robot manipulator has limit torque which is applied to the rotating member serving as an output unit. However, an unexpected external force may be applied to the robot manipulator which comes in contact with the outside during an operation. When the rotating shaft and the rotating member are rigidly connected to each other, the rotating shaft is rotated continuously even when an external force is applied to the rotating member. On the other hand, the rotating member cannot be rotated because of the interference of the external force. As a result, torque equal to or greater than limit torque may be applied between the rotating shaft and the rotating member, and the device may be damaged. Further, when a person or an object comes in contact with the rotating member which is being rotated, the person or object may be hurt or damaged.

Therefore, when an external force equal to or greater than limit torque is applied to the rotating device, the person or object coming in contact with the rotating device needs to be protected, while the rotating device is protected.

To secure the stability of the rotating device, a coupling device has been proposed, in which a rotational displacement occurs above predetermined torque. That is, a rotating shaft and a rotating member are not rigidly connected to each other, but are separated above predetermined torque such that an independent rotational displacement occurs.

However, the conventional rotating device in which a rotational displacement occurs in the rotating shaft and the rotating member has a complex structure, and the weight of the rotating device increases inevitably because of the structure. Further, the rotating device does not have a function of returning to the initial position, after an external force is eliminated. Therefore, a separate sensor or control unit, which returns the rotating shaft and the rotating member to the initial position after a rotational displacement has been formed in the rotating shaft and the rotating member by an external force, should be additionally installed.

DISCLOSURE OF INVENTION

Technical Problem

The present invention has been made in view of the above problems, and it is an object of the present invention to provide a device for generating limit torque, in which a rotational displacement occurs when an external force equal to or greater than limit torque is applied to a rotating device, and a rotating device using the same.

It is another object of the present invention to provide a coupling device for generating limit torque, which automatically returns to the initial position when an external force is eliminated, and a rotating device using the same.

Technical Solution

In accordance with an aspect of the present invention, the above and other objects can be accomplished by the provision of a coupling device for coupling a rotating shaft and a rotating member, the coupling device comprising: a flexible member that is vertically connected to a rotating shaft and of which the length can be varied in an inward and outward direction with respect to the rotating shaft; an elastic member that is connected to the flexible member and causes the flexible member to receive an elastic force in the outward direction with respect to the rotating shaft; and a cam member that is rotatably connected to the rotating shaft and delivers a rotating force of the rotating shaft to a rotating member.

The cam member has a through-hole passing through the top and bottom surfaces of the cam member, the flexible member is inserted into the through-hole of the cam member so as to abut on an inner surface of the through-hole due to the elastic force of the elastic member, and an initial-position portion, in which the flexible member is positioned at the initial stage, and a displaced-position portion, which has a smaller diameter than the initial-position portion and of which the diameter is constant about the rotating shaft, are formed on the inner surface of the through-hole.

The displaced-position portion may be formed symmetrically with respect to the initial-position portion.

The through-hole of the cam member may be formed symmetrically with respect to the rotating shaft, and the flexible member may be formed symmetrically with respect to the rotating shaft.

The cam member may have another through-hole formed in the opposite side to the through-hole with respect to the rotating shaft, the flexible member may be formed symmetrically with respect to the rotating shaft so as to be inserted into the through-hole and the another through-hole of the cam member, respectively, and the another through-hole may include an initial-position portion in which the flexible member is positioned and a return-position portion of which the radius decreases from the initial-position portion.

The radius of the return-position portion may decrease from the initial-position portion linearly with a constant slope.

The through-hole may further include a return-position portion of which the radius decreases linearly from the initial-position portion, the through-hole of the cam member may be formed symmetrically with respect to the rotating shaft; and the flexible member may be formed symmetrically with respect to the rotating shaft.

The radius of the return-position portion may decrease from the initial-position portion linearly with a constant slope.

The elastic member may be a spiral spring.

The flexible member abutting on the inner surface of the through-hole may have a roller formed at one end thereof, the roller being capable of rotating.

In accordance with another aspect of the present invention, there is provided a rotating device comprising the coupling device.

The rotating device may be a joint of a manipulator.

Advantageous Effects

The coupling device according to the present invention may be used for a rotating device such as a joint of a robot manipulator, and can generate limit torque with a relatively simple structure.

Further, when a rotating member of a rotating device comes in contact with a person or an object, a rotational displacement occurs in the coupling device so as to protect the device, which makes it possible to secure the safety of the person or object.

Further, without an additional unit, the coupling device automatically returns to the initial position, when an external force is eliminated. Therefore, the structure of the rotating device can be simplified, and a separate step for returning to the initial position does not need to be performed.

BRIEF DESCRIPTION OF THE DRAWINGS

FIG. 6 is a conceptual diagram showing the relationship of force at a step portion 112b formed at the boundary between an initial-position portion 112c and a displaced-position portion 112a;

BEST MODE FOR CARRYING OUT THE INVENTION

Hereinafter, preferred embodiments of the present invention will be described. While the present invention is described with reference to embodiments thereof, the technical idea and the construction and operation of the invention are not limited to the embodiments.

Figure 1:
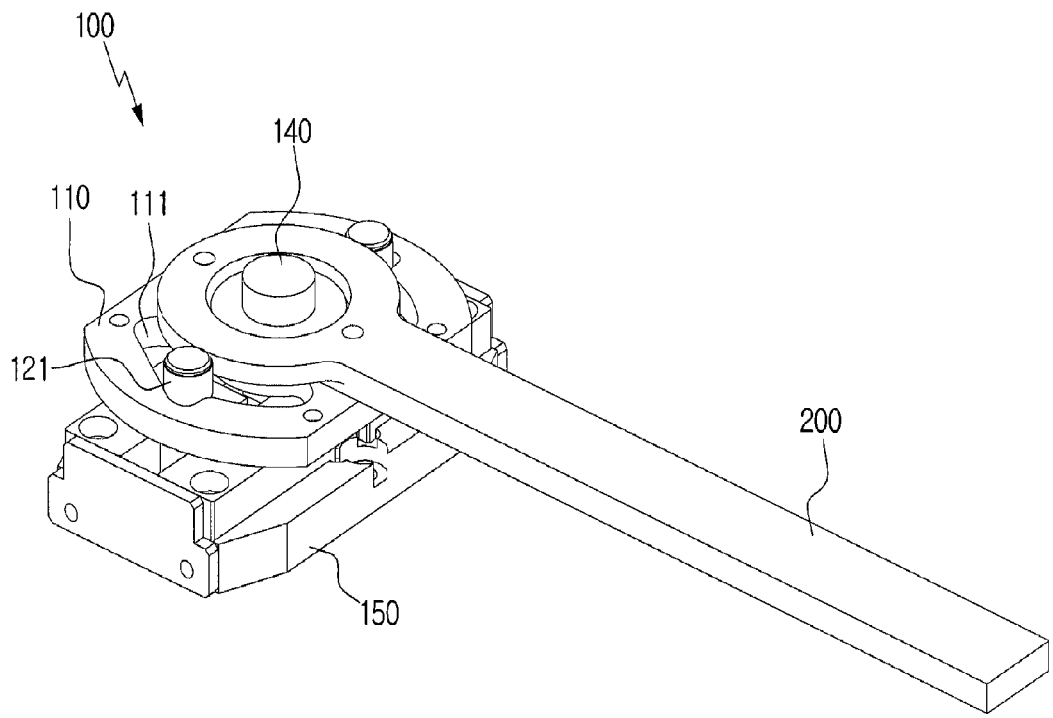
FIG. 1 is a perspective view of a coupling device 100 according to an embodiment of the invention, the coupling device having a rotating member 200 connected thereto.
Figure 2:
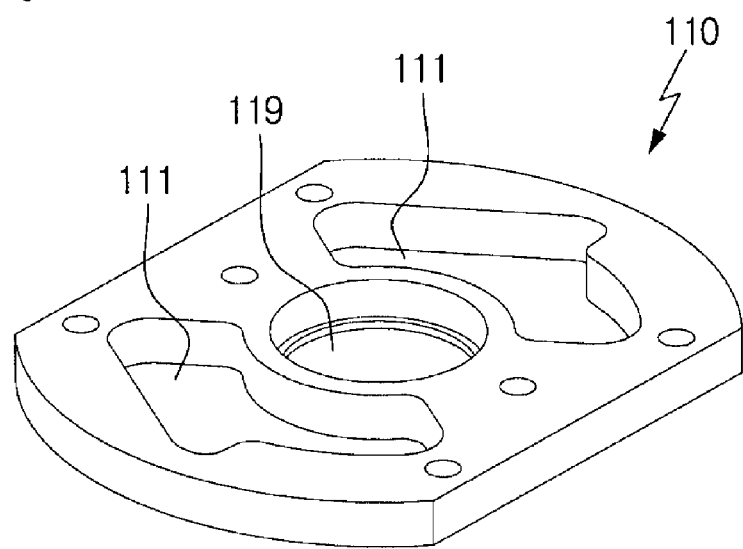
FIG. 2 is a perspective view of a cam member 110 according to the embodiment of the invention.
Figure 3:
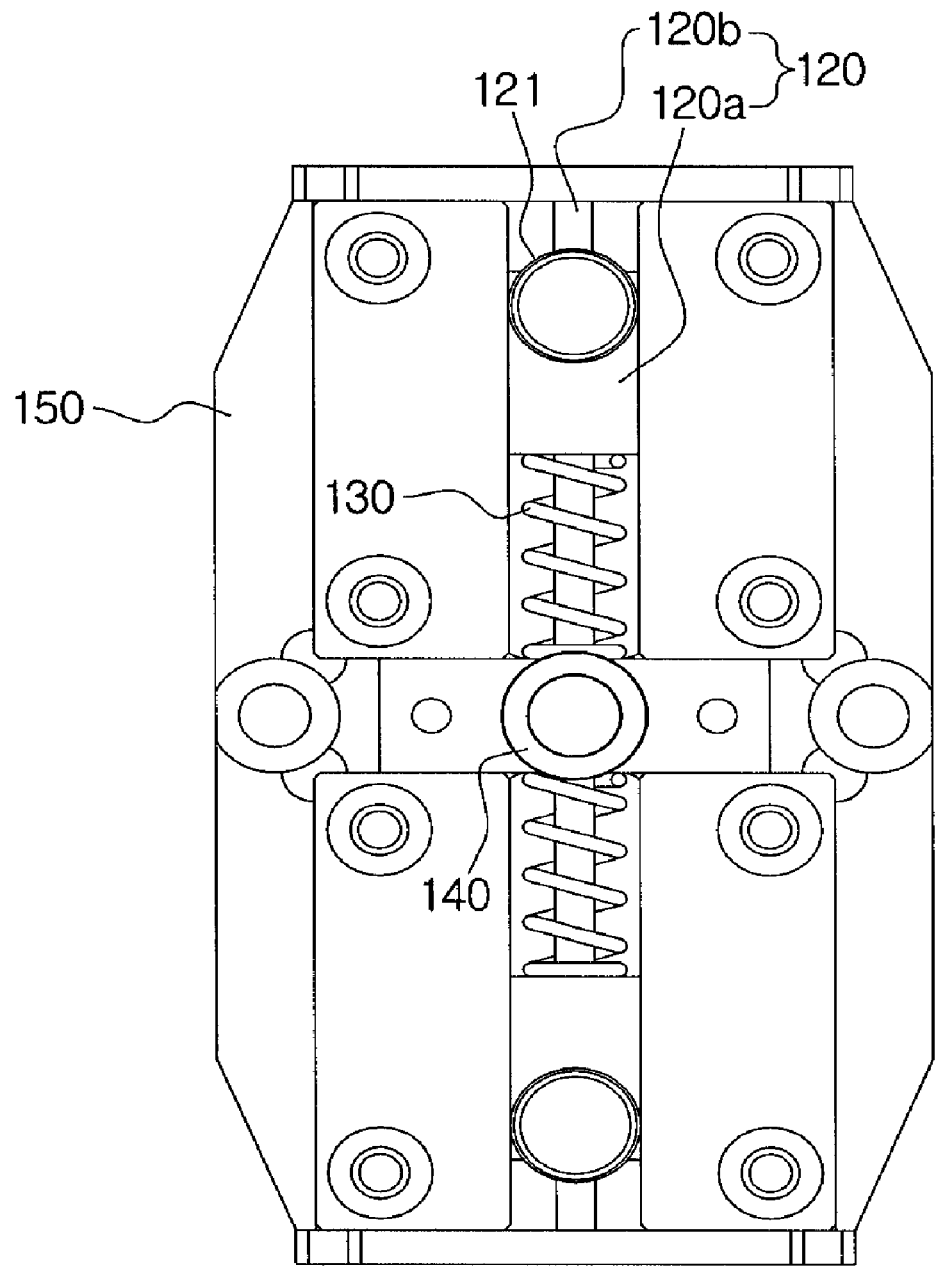
FIG. 3 is a plan view of coupling device according to the embodiment of the invention, coupling device including a flexible member 120 and an elastic member 130.

FIG. 1 is a perspective view of a coupling device according to an embodiment of the invention, the coupling device having a rotating member 200 connected thereto. FIG. 2 is a perspective view of a cam member 110 according to the embodiment of the invention. FIG. 3 is a plan view of the coupling device according to the embodiment of the invention, the coupling device including a flexible member 120 and an elastic member 130

As shown in FIG. 1, the rotating member 200 is connected to the cam member 110. The rotating member 200 and the cam member 110 are coupled to each other through a fixing element such as a screw so as to be rotated together.

As shown in FIG. 2, the cam member 110 has a rotating-shaft coupling hole 119 formed at the center thereof such that a rotating shaft 140 can be coupled to the rotating-shaft coupling hole 119. The cam member 110 and the rotating shaft 140 are coupled to each other through the rotating-shaft coupling hole 119, but are not rigidly coupled. That is, the cam member 110 is coupled to the rotating shaft 140 so as to rotate separately from the rotating shaft 140. Preferably, although not shown, a bearing through which the cam member 110 can be rotated separately from the rotating shaft 140 is coupled to the rotating-shaft coupling hole 119.

As shown in FIG. 3, the flexible member 120 is installed so as to extend in an inward and outward direction, from the rotating shaft 140. In this embodiment, the flexible member 120 is connected in such a manner that a moving body 120a can move on a movement rod 120b. An outer end of the moving body 120a is defined as the end of the flexible member 120, and the distance from the rotating shaft 140 to the moving body 120a is defined as the effective length of the flexible member 120. When the moving body 120a of the flexible member 120 is moved inwardly or outwardly along the movement rod 120b with respect to the rotating shaft 140, the distance from the rotating shaft 140 to the moving body 120a, that is, the effective length of the flexible member 120 varies. The elastic member 130 is connected between the rotating shaft 140 and the moving body 120a.

To facilitate the connection among the flexible member 120, the elastic member 130 and the cam member 110, a frame 150 is formed. As shown in FIG. 3, the flexible member 120 and the elastic member 130 are easily coupled to each other through the frame 150. In this embodiment, the rotating shaft 140 is formed on the front surface of the frame 150, and a rotating drum 201 (refer to FIG. 12) which is rotated by a driving unit such as a driving motor is coupled to the rear surface of the frame 150. When the rotating drum is rotated by the driving unit, the entire frame 150 is rotated, and the flexible member 120, the elastic member 130 and the rotating shaft 140, which are connected through the frame 150, are also rotated.

Returning to FIG. 1, a rolling body 121 is formed at the end of the moving body 120a of the flexible member 120 and extends so as to come in contact with the inner surface of a through-hole 111 formed in the cam member 110. When the moving body 120a is moved while being in contact with the inner surface of the through-hole 111, the rolling body 121 reduces friction on the contact surface. To minimize the friction, the rolling body 121 is constructed so as to rotate along the inner surface of the through-hole 111. Preferably, the rolling body 121 is composed of a roller.

Through the coupling hole 119 formed at the center of the cam member 110, the cam member 110 is rotatably coupled to the rotating shaft 140 formed on the front surface of the frame 150. In this case, the rolling body 121 formed on the flexible member 120 is inserted into the through-hole 111 formed in the cam member 110 so as to come in contact with the inner surface of the through-hole 111. At the initial stage, the rolling body 121 is positioned at the farthest portion from the rotating shaft on the inner surface of the through-hole 111, that is, at a portion of which the diameter is the largest. The position is referred to as the initial position.

The diameter of the portion which is the farthest from the rotating shaft on the inner surface of the through-hole 111 is smaller than the effective length of the flexible member 120 before the frame 150 is connected to the cam member 110. Therefore, when the frame 150 is connected to the cam member 110 such that the rolling body 121 is inserted into the through-hole 111 formed in the cam member 110 so as to come in contact with the inner surface of the through-hole 111, the elastic member 130 is compressed by a predetermined length toward the rotating shaft 140. The rolling body 121 applies a predetermined force to the inner surface of the through-hole 111 at the initial position through the elastic force of the elastic member 130.

Hereinafter, the operation principle of the coupling device according to the invention will be described with reference to FIGS. 4 to 6.

Figure 4:
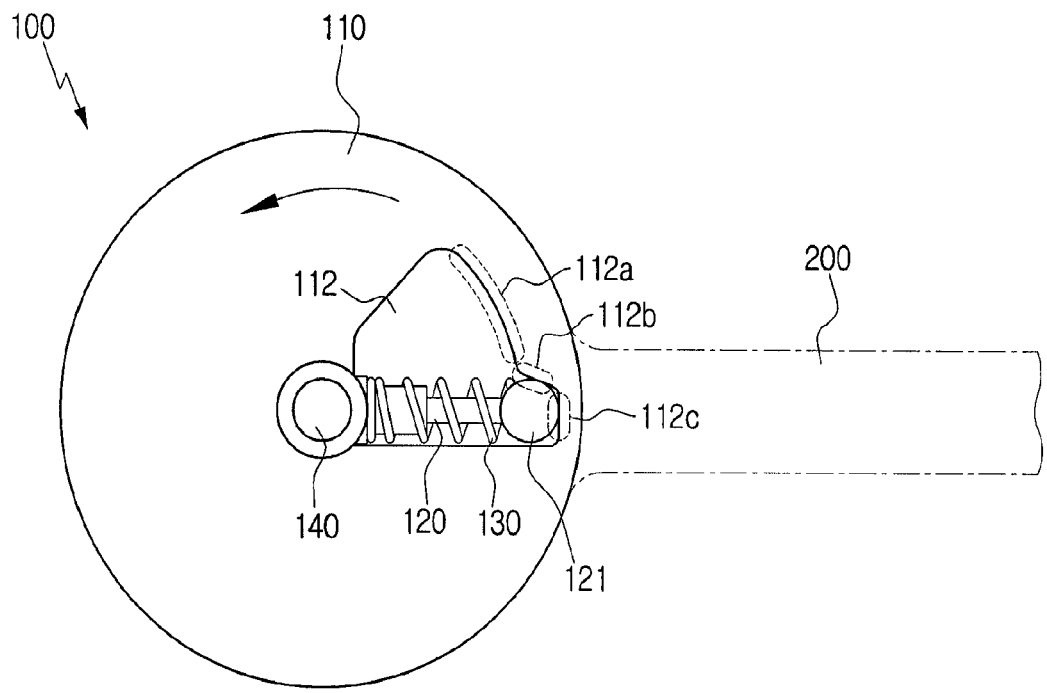
FIG. 4 is a schematic plan view of the coupling device 100 according to the embodiment of the invention, showing an operation of coupling device 100 at the initial position.

FIG. 4 is a schematic plan view of the coupling device 100 according to the embodiment of the invention, showing an operation of the coupling device 100 at the initial position. FIG. 5 is a schematic plan view of the coupling device 100 according to the embodiment of the invention, showing an operation of the coupling device 100 at a displaced position. In FIGS. 4 and 5, the rotating member 200 connected to the cam member 110 is indicated by an alternating long and short dash line, and the frame 150 is not shown. Further, the flexible member 120 is briefly illustrated. As for the elastic member 130 connected to the flexible member 120, a spring is used.

Figure 5:
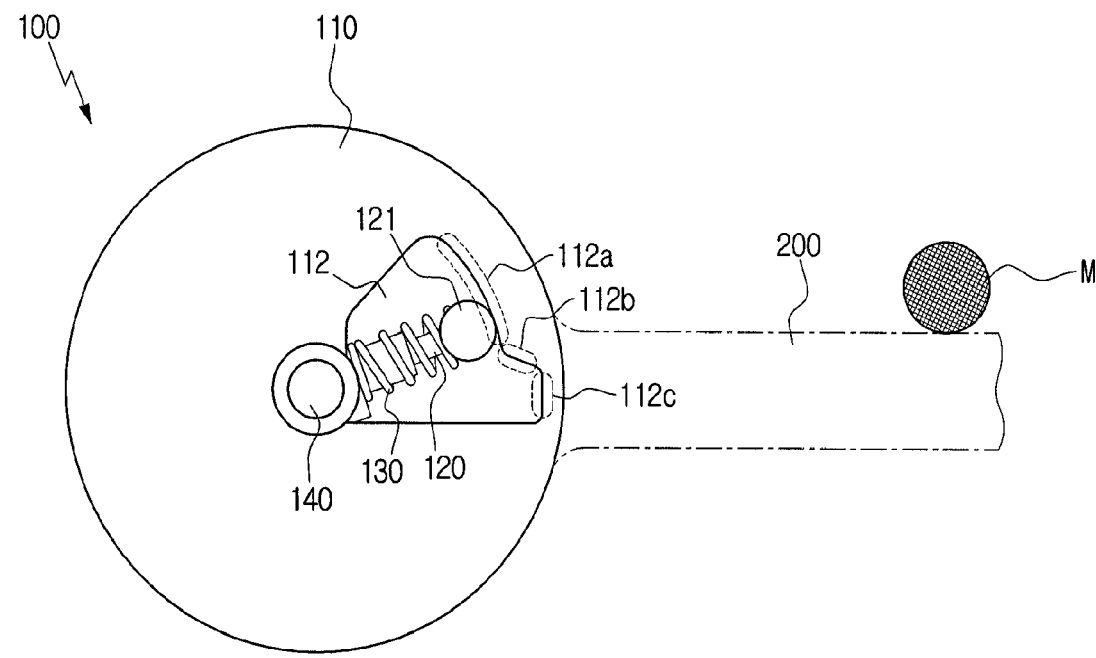
FIG. 5 is a schematic plan view of the coupling device 100 according to the embodiment of the invention, showing an operation of the coupling device 100 at a displaced position.

As shown in FIGS. 4 and 5, the cam member 110 has a through-hole 112 passing through the top and bottom surfaces thereof. The through-hole 112 includes an initial-position portion 112c, of which the diameter from the rotating shaft 140 is the largest, and a displaced-position portion 112a which is formed adjacent to the initial-position portion 112c along the rotational direction of the cam member 110. The displaced-position portion 111a has a smaller radius than the initial-position portion 112c. Accordingly, a step portion 112b is formed at the boundary between the initial-position portion 112c and the displaced-position portion 112a. The displaced-position portion 112a is formed in a circular-arc shape having a constant radius, from the rotating shaft 140.

According to this embodiment, one through-hole 112 is formed in the cam member 110. The embodiment can be applied to a case where the rotating member 200 rotates in the counterclockwise direction. Since one through-hole 112 is formed in the cam member 110, the flexible member 120 which is to be coupled to the cam member 110 is formed in only one direction.

At the initial stage, the rolling body 121 is positioned at the initial-position portion 112c when being coupled to the cam member 110. The position is referred to as the initial position. At the initial position, the rolling body 121 applies a predetermined force to the inner surface of the through-hole 112, that is, the initial-position portion 112c through the elastic force of the elastic member 130. As will be described below in detail, unless an external force is applied to the rotating member, the elastic force of the elastic member 130 restricts the rolling body 121 from being rotated freely at the initial position. That is, the step portion 112b formed at the boundary between the initial-position portion 112c and the displaced-position portion 112a prevents the rolling body 121 from leaving the initial-position portion 112c. Therefore, as shown in FIG. 4, when the flexible member 120 is rotated by the driving unit, the cam member 110 is rotated together, and the rotating member 200 fixed to the cam member 110 is rotated about the rotating shaft 140. On the other hand, when a predetermined force is applied to the rotating member 200 by an object M, the rolling body 121 leaves the initial-position portion 112c along the step portion 112c formed at the boundary between the initial-position portion 112c and the displaced-position portion 112a so as to move to the displaced-position portion 112a. As shown in FIG. 5, the rotating shaft 140 and the cam member 110 are rotatably connected to each other. Therefore, even when the rotating member 200 and the cam member 110 connected to the rotating member 200 are not rotated any more because of the object M, the flexible member 120 can be rotated.

Figure 6:
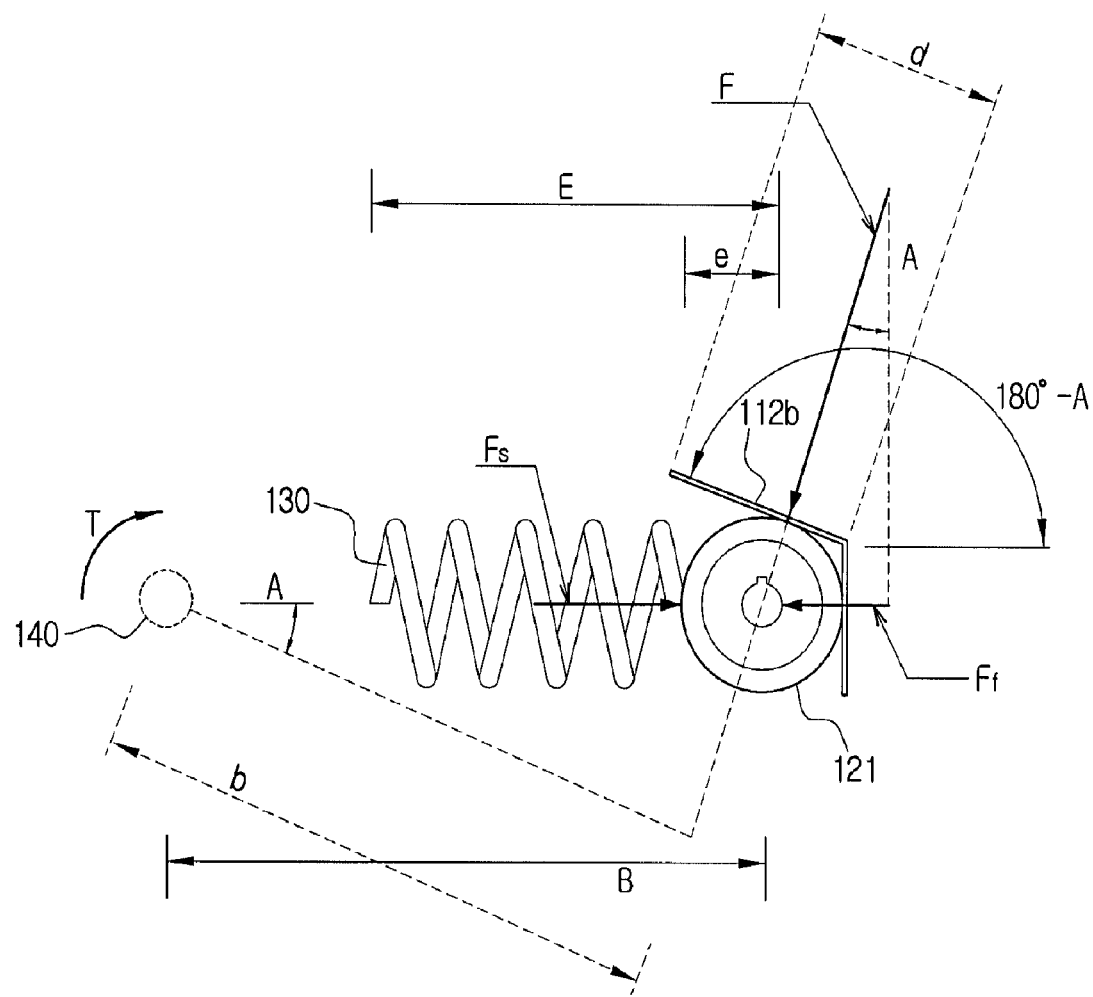

FIG. 6 is a conceptual diagram showing the relationship of force at the step portion 112b formed at the boundary between the initial-position portion 112c and the displaced-position portion 112a.

Referring to FIG. 6, the relationship of force applied to the rolling body 121 in the step portion 111b is represented by the following expressions. The following Equations are used for calculating torque at which the first rotational displacement occurs.

MathFigure 1

$$F_s = K \times e \qquad \text{[Math. 1]}$$

MathFigure 2

$$F = T/b = T/(B \cdot \cos(A)) \qquad \text{[Math. 2]}$$

MathFigure 3

$$F_f = F \times \sin(A) = T \times \frac{\sin(A)}{B \cdot \cos(A)} = \frac{T}{B} \cdot \tan(A) \qquad \text{[Math. 3]}$$

In Equations 1 to 3, A represents the angle of a plane tangent to the rolling body 121 on the step portion 112b, E represents the initial length of the spring, e represents the compressed length of the spring at the initial position, K represent a spring constant, B represents the effective length of the flexible member, b represents the length of a tangent line formed by the angle of the plane tangent to the rolling body 121 on the step portion 112b, T represents torque applied from outside, F represents a force generated by the external torque T and the length b of the tangent line, $F_s$ represents a recovery force generated by the compressed length e of the spring, and $F_f$ represents a force where the force F generated by the external torque T is projected in the same direction as that of a force $F_{-s}$.

As seen in Equations 1 to 3 and FIG. 6, $F_s$ determines the limit torque of the coupling device according to the invention. That is, when the external torque T is applied to the coupling device, $F_f$ is applied from the inner surface of the cam member 110 toward the rotating shaft 140. When $F_s$ is equal to $F_f$ ($F_s = F_f$), the external torque T corresponds to the limit torque. As shown in FIG. 5, when the object M comes in contact with the rotating member 200, torque T is applied to the coupling device 100. If a force $F_f$ generated by the torque T satisfies $F_s \leq F_f$, the moving body 120a of the flexible member 120 moves toward the rotating shaft 140 so as to compress the elastic member 130. When the flexible member 120 is rotated in such a manner that the effective length thereof decreases, the flexible member 120 leaves the initial-position portion 112c along the step portion 112b of the through-hole 112 of the cam member 110 so as to move to the displaced-position portion 112a. That is, although the rotating member 200 and the cam member 110 are blocked by the object M so as not to rotate, the flexible member 120 which is rotated by the driving unit can rotate by a predetermined displacement In the coupling device 100 according to this embodiment, when the rotating member 200 is not rigidly coupled to the rotating shaft 140 and the rotation is hindered by an external force equal to or greater than the torque which can be endured by the device, the device can be protected through a constant rotational displacement. Further, the torque is not directly transmitted to an object or a person coming in contact with the rotating member 200, but the shock can be absorbed.

Further, the limit torque can be simply generated by forming a through-hole in a plate member, and can be set in various ranges by adjusting the above-described variables. In particular, as the elastic modulus K, the initial compressed length e, and the angle A of the step portion are adjusted, the limit torque can be set in various ranges without a large change in the entire shape.

Figure 7:
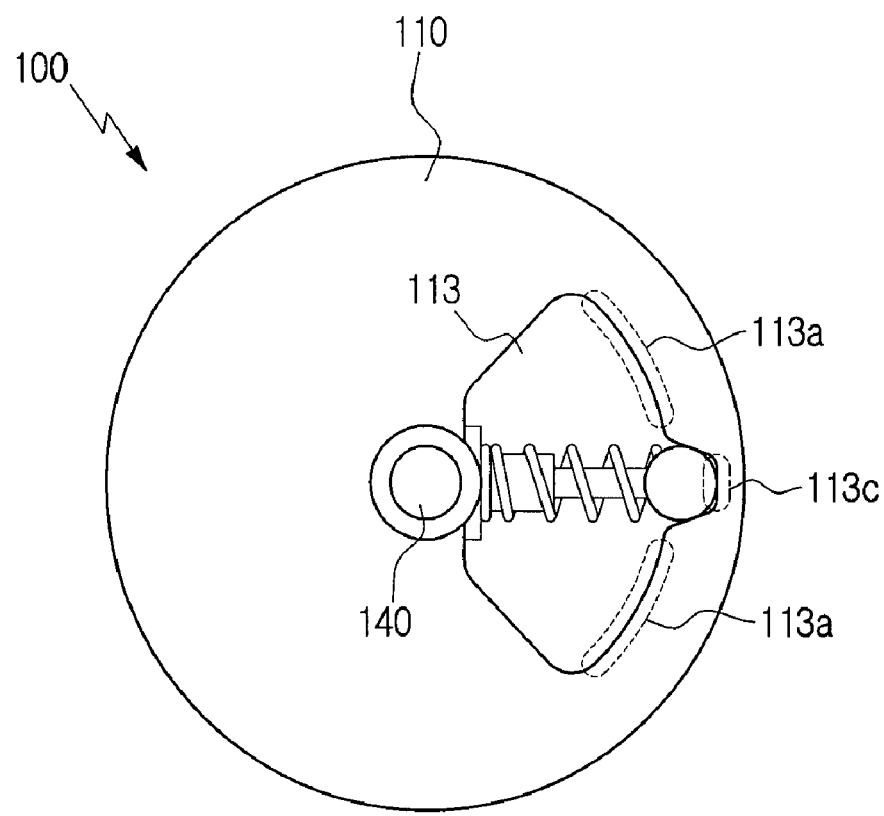
FIGS. 7 and 8 are schematic plan views of coupling device 100 according to another embodiment of the invention.
Figure 8:
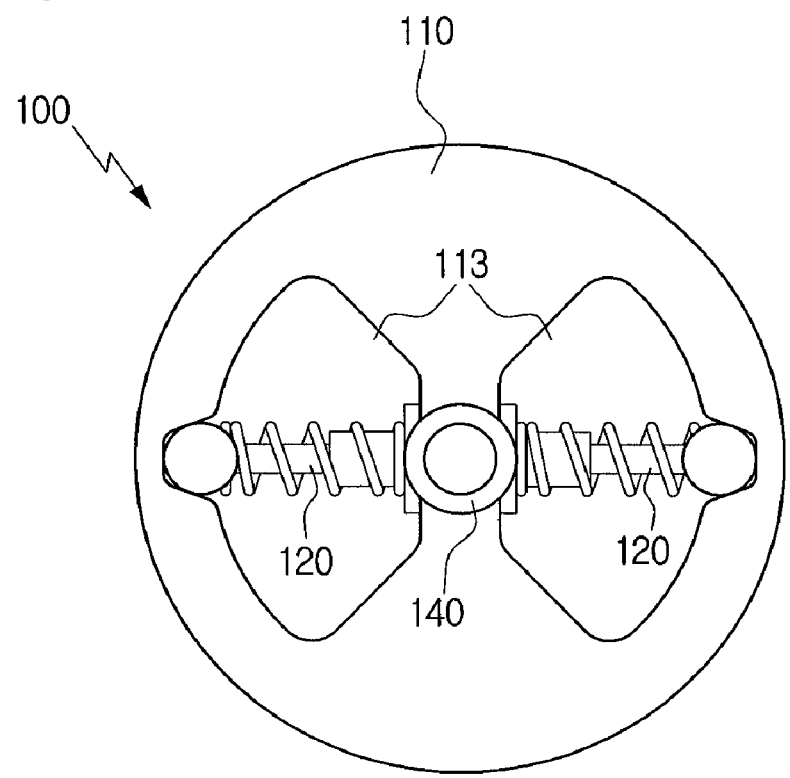

FIGS. 7 and 8 are schematic plan views of a coupling device 100 according to another embodiment of the invention.

As shown in FIG. 7, a through-hole formed in the cam member 110 includes an initial-position portion 113c and displaced-position portions 113 which are formed symmetrically with respect to the initial-position portion 113c. Therefore, a rotational displacement can occur above predetermined torque in both rotational directions. Accordingly, the installation does not need to be changed depending on the direction of rotation.

Further, as shown in FIG. 8, a pair of through-holes 113 including an initial-position portion 113c and displaced-position portions 113a which are formed symmetrically with respect to the initial-position portion 113c may be formed so as to be formed symmetrically with respect to the rotating shaft 140. In this case, flexible members 120 are also formed in both directions with respect to the rotating shaft 140. Compared with when the through-hole is formed in only one direction, the coupling device 100 can adjust the center of gravity during the rotation.

Figure 9:
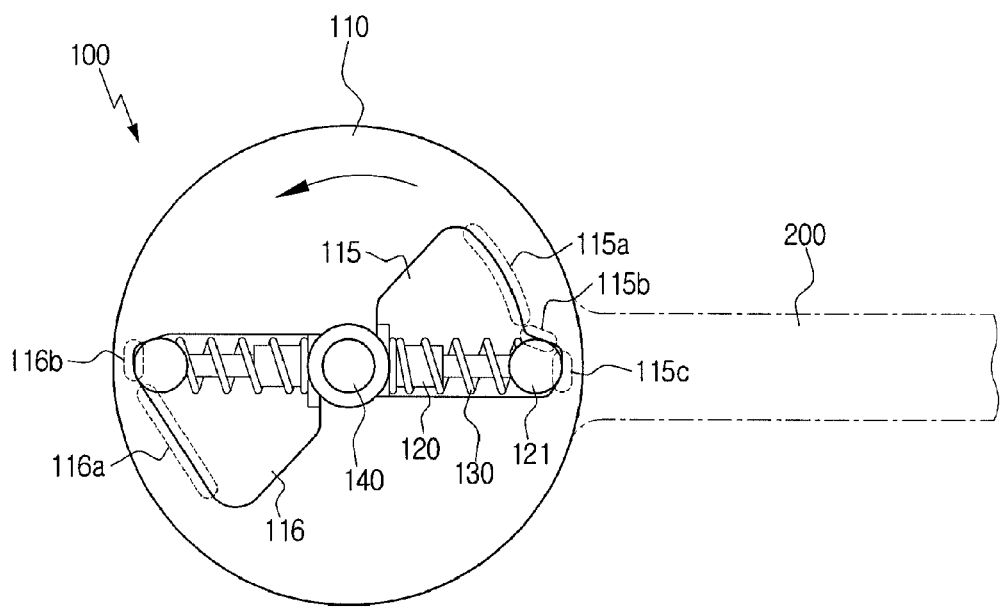
FIGS. 9 and 10 are schematic plan views of a coupling device 100 according to a further embodiment of the invention, showing an operation of the coupling device 100.
Figure 10:
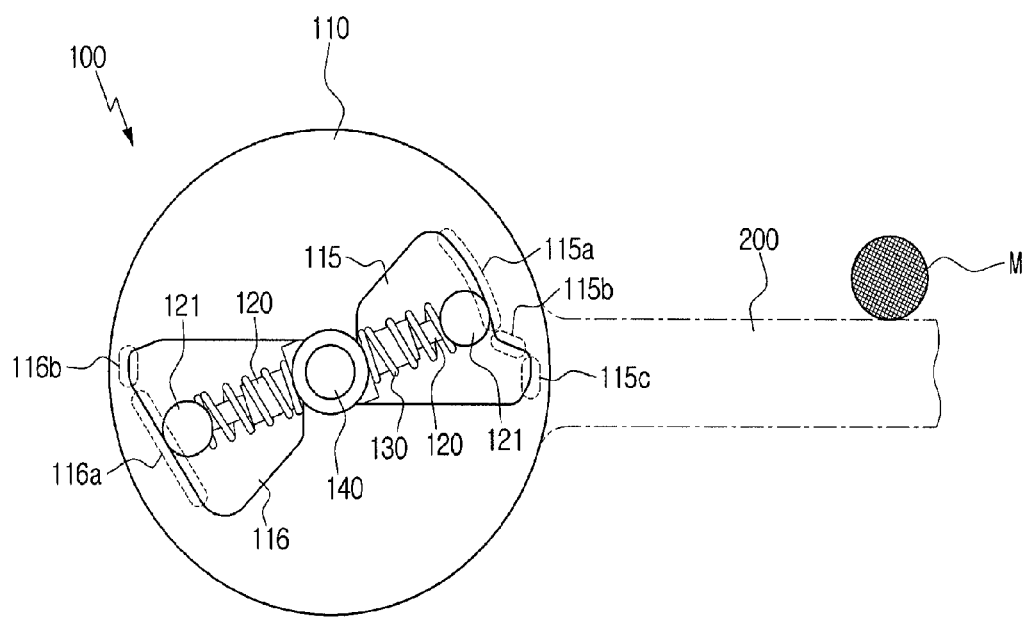
Figure 11:
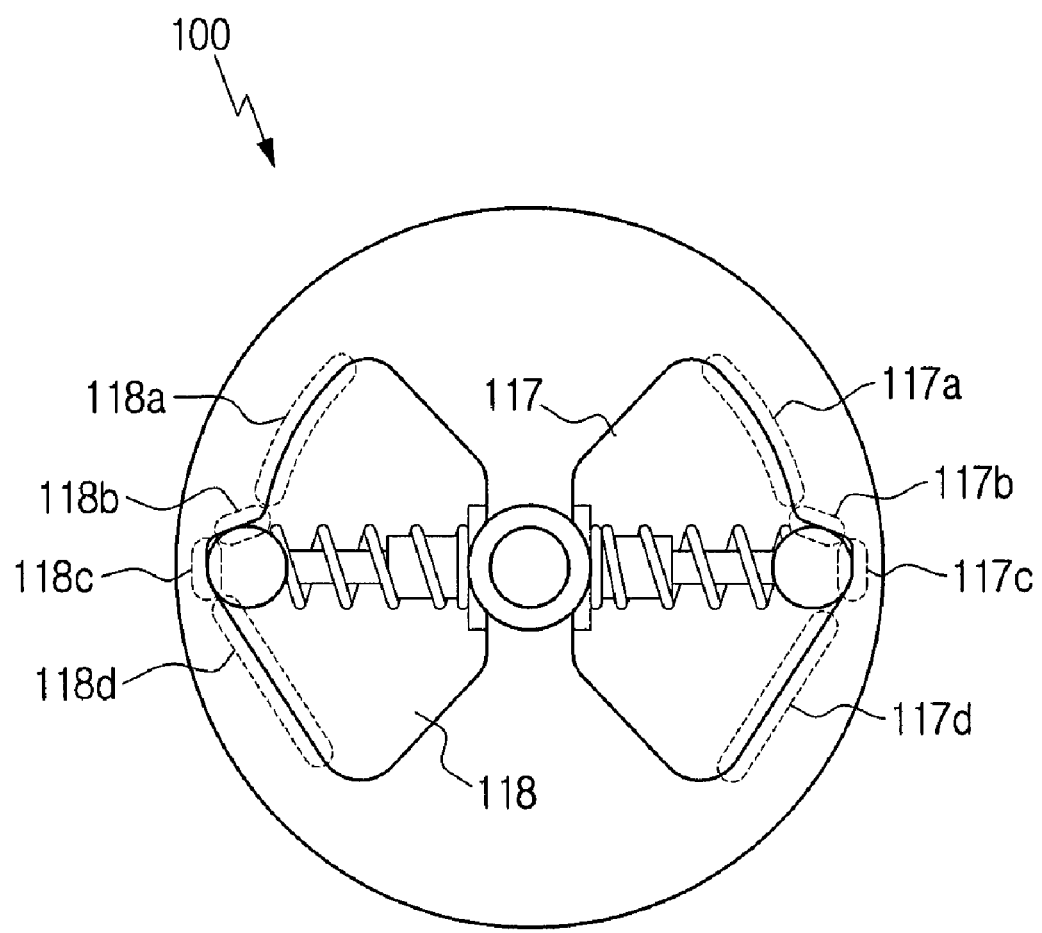
FIG. 11 is a schematic plan view of a coupling device 100 according to a still further embodiment of the invention.

FIGS. 9 and 10 are schematic plan views of a coupling device 100 according to a further embodiment of the invention, showing an operation of the coupling device 100. FIG. 11 is a schematic plan view of a coupling device 100 according to a still further embodiment of the invention.

As shown in FIGS. 9 and 10, the cam member 110 includes a first through-hole 115 having a displaced-position portion 115a, a step portion 115b, and an initial-position portion 115c formed therein and a second through-hole 116 having a return-position portion 116a and an initial-position portion 116b formed therein.

Since the shape and function of the first-through hole 115 are the same as those of the through-hole 111 shown in FIGS. 4 and 5, the detailed descriptions thereof will be omitted. The return-position portion 116a of the second through-hole 116 is constructed in such a manner that the radius of the return-position portion 116a decreases from the initial-position portion 116b in the rotational direction of the cam member 110 linearly with a constant slope. However, the radius of the return-position portion 116a does not need to decrease linearly, but the return-position portion 116a may be formed in a curved-line shape of which the radius decreases smoothly at a constant ratio from the initial-position portion 116b.

As shown in FIG. 9, unless an external force is applied to the rotating member 200, the flexible members 120 formed in both directions are positioned in the initial-position portion 115c of the first through-hole 115 and the initial-position portion 116b of the second through-hole 116, respectively. In this case, the elastic forces of the elastic members 130 connected to the flexible members 120 are applied to the initial-position portions 115c and 116b, respectively. Therefore, when the flexible members 120 are rotated by the driving unit, the cam member 110 and the rotating member 200 are rotated together.

As shown in FIG. 10, when the rotating member 200 comes in contact with an object M during the rotation, the effective length of the flexible member 120 abutting on the first through-hole 115 decreases, and simultaneously, the rolling body 121 connected to the flexible member 120 moves to the displaced-position portion 115a through the step portion 115b. When the rolling body 121 connected to the flexible member 120 moves to the displaced-position portion 115 along the step portion 115b, the flexible member 120 abutting on the second through-hole 116 moves to the return-position portion 116a. Since the return-position portion 116a is constructed in such a manner that the radius thereof decreases in the rotational direction of the cam member 110 from the rotating shaft 140 with the initial-position portion 116b set to a base point, the effective length of the flexible member 120 abutting on the second through-hole 116 also decreases, and the elastic member 130 connected to the flexible member 120 is compressed by the return-position portion 116a. Therefore, the elastic force of the elastic member 130 is applied to the return-position portion 116a of the second through-hole 116.

When the external force applied to the rotating member 200 disappears, that is, when the object M is removed, the flexible member 120 abutting on the second through-hole 116 automatically returns to the initial-position portion 116b passing through the return-position portion 116a having a smooth surface, because the external force offset by the elastic force applied to the return-position portion 116a of the second through-hole 116 is eliminated. Therefore, when the flexible member 120 abutting on the second through-hole 116 returns due to the elastic force, the flexible member 120 abutting on the first through-hole 115 also returns to the initial-position portion 115c.

In the coupling device 100 according to this embodiment, an external force is applied to the rotating member such that the coupling device 100 leaves the initial position so as to generate a constant rotational displacement. Then, when the external force is eliminated, the coupling device 100 automatically returns to the initial position. Therefore, a device for returning the coupling device 100 to the initial position does not need to be installed, or an additional step does not need to be performed. Further, the coupling device 100 with a simple structure is obtained by the simple operation of forming a through-hole in a plate member.

As shown in FIG. 11, the cam member 110 may include two through-holes 117 and 118 which are formed symmetrically in the side-to-side direction with respect to the rotating shaft 140. The through-hole 117 includes an initial-position portion 117c, a displaced-position portion 117a, and a return-position portion 117d. The displaced-position portion 117a and the return-position portion 117d are formed in both sides of the initial-position portion 117c. The through-hole 118 includes an initial-position portion 118c, a displaced-position portion 118a, and a return-position portion 118d. The displaced-position portion 118a and the return-position portion 118d are formed in both sides of the initial-position portion 118c. Therefore, a rotational displacement can be generated above predetermined torque in both rotational directions. Accordingly, the installation does not need to be changed depending on the direction of rotation.

The coupling device 100 according to the invention can be applied to a rotating device such as a joint of a robot manipulator. The coupling device 100 is connected to a rotating member serving as an output unit of the rotating device so as to deliver a rotating force of a driving unit of the rotating device to the rotating member. When an external force is applied to the rotating member, the coupling device 100 exerts the above-described function.

Figure 12:
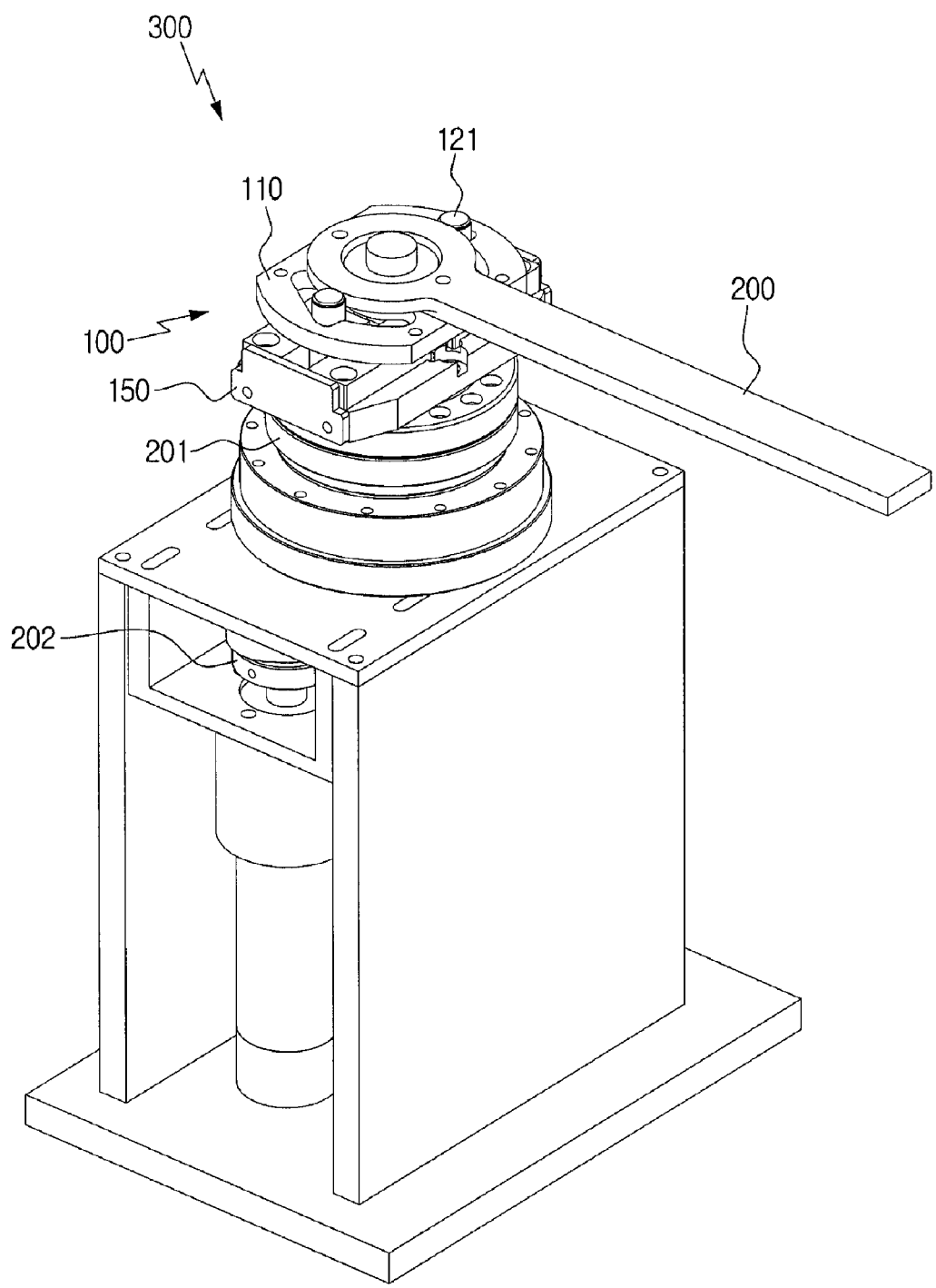
FIG. 12 is a perspective view of a joint 200 of the manipulator using the coupling device 100 according to the invention.

FIG. 12 is a perspective view of a joint 200 of the manipulator using the coupling device 100 according to the invention.

As shown in FIG. 12, a rotating member 200 serving as an output unit of a joint 200 of the manipulator is connected to the cam member 110 of the coupling device 100 according to the invention. The frame 150 connecting the flexible member of the coupling device 100 to the elastic member is connected to the rotating drum 201. The rotating drum 201 is rotated by a driving unit such as a driving motor so as to rotate the frame 150.

INDUSTRIAL APPLICABILITY

The coupling device according to the present invention can be used for a rotating mechanism such as a joint of a robot manipulator so as to be utilized in various industrial fields. The rotating device having the coupling device according to the invention can be used in an operation environment where stability should be guaranteed.

The invention claimed is:

1. A coupling device for coupling a rotating shaft and a rotating member, comprising:
a first flexible member and a second flexible member that are vertically connected to the rotating shaft having a variable length that can be varied in an inward and outward direction with respect to the rotating shaft;
elastic members that are connected to the first flexible member and the second flexible member respectively, and cause the first flexible member and the second flexible member to receive an elastic force in the outward direction with respect to the rotating shaft; and
a cam member that is rotatably connected to the rotating shaft and delivering a rotating force of the rotating shaft to the rotating member, wherein the cam member is formed with a first through-hole and a second through-hole passing through top and bottom surfaces of the cam member at opposite sides with respect to the rotating shaft;
wherein the first flexible member and the second flexible member are formed symmetrically with respect to the rotating shaft and inserted into the first through-hole and the second through-hole respectively so that the first flexible member and the second flexible member abut inner surfaces of the first through-hole and the second through-hole due to the elastic forces of the elastic members; and
wherein a first initial-position portion configured to position the first flexible member at an initial stage, and a displaced-position portion having a constant diameter smaller than the initial-position portion about the rotating shaft are formed on the inner surface of the first through-hole;
wherein a second initial-position portion configured to position the second flexible member and a return-position portion having a radius decreasing with increase in distance from the second initial-position portion are formed on the inner surface of the second through-hole;
wherein the first flexible member rotates free of the cam member up until an angular displacement of the first flexible member equals an arc length of the first through-hole when an external force equal to or greater than a limit torque of the coupling device is applied to the rotating member.

2. The coupling device as set forth in claim 1, wherein the radius of the return-position portion decreases with increase in distance from the second initial-position portion linearly with a constant slope.

3. The coupling device as set forth in claim 1, wherein the elastic members are spiral springs.

4. The coupling device as set forth in claim 1, wherein the first flexible member and the second member abutting on the inner surfaces of the first through-hole and the second through-hole have rollers formed at one ends thereof, the rollers being capable of rotating.

5. A coupling device for coupling a rotating shaft and a rotating member, comprising:
flexible members that are vertically connected to the rotating shaft having a variable length that can be varied in an inward and outward direction with respect to the rotating shaft;
elastic members that are connected to the flexible members and cause the flexible members to receive an elastic force in the outward direction with respect to the rotating shaft; and
a cam member that is rotatably connected to the rotating shaft and delivering a rotating force of the rotating shaft to the rotating member, wherein the cam member is formed with through-holes passing through top and bottom surfaces of the cam;
wherein the flexible members are respectively inserted into the first through-holes of the cam member so that the flexible members abut inner surfaces of first through-holes due to the elastic forces of the elastic members;
initial-position portions configured to position the flexible members at an initial stage, a displaced-position portion having a constant diameter smaller than the initial-position portions about the rotating shaft, and a return-position portion having a radius decreasing with increase in distance from the initial-position portions are formed on the inner surface of the through-holes;
the through-holes of the cam member are formed symmetrically with respect to the rotating shaft;
the flexible members are formed symmetrically with respect to the rotating shaft; and
wherein the flexible members rotate free of the cam member up until angular displacements of the flexible members equal an arc length of the displaced-position of the through-holes when an external force equal to or greater than a limit torque of the coupling device is applied to the rotating member.

6. The coupling device as set forth in claim 5, wherein the radius of the return-position portion decreases from the initial-position portion linearly with a constant slope.

7. The coupling device as set forth in claim 5, wherein the elastic members are spiral springs.

8. The coupling device as set forth in claim 5, wherein the flexible members abutting on the inner surfaces of the through-holes have rollers formed at one ends thereof, the rollers being capable of rotating.

9. A rotating device comprising:
a rotating member;
a rotating shaft rotated by a driving motor; and
a coupling device coupling the rotating shaft and the rotating member, wherein the coupling device comprises:
a first flexible member and a second flexible member that are vertically connected to the rotating shaft having a variable length that can be varied in an inward and outward direction with respect to the rotating shaft;
elastic members that are connected to the flexible member and cause the flexible member to receive an elastic force in the outward direction with respect to the rotating shaft; and
a cam member that is rotatably connected to the rotating shaft and delivering a rotating force of the rotating shaft to the rotating member, wherein the cam member is formed with a first through-hole and a second through-hole passing through top and bottom surfaces of the cam member at opposite sides with respect to the rotating shaft;

wherein the first flexible member and the second flexible member are formed symmetrically with respect to the rotating shaft and inserted into the first through-hole and the second through-hole respectively so that the first flexible member and the second flexible member abut inner surfaces of the first through-hole and the second through-hole due to the elastic forces of the elastic members; and wherein a first initial-position portion configured to position the first flexible member at an initial stage, and a displaced-position portion having a constant diameter smaller than the initial-position portion about the rotating shaft are formed on the inner surface of the first through-hole;

wherein a second initial-position portion configured to position the second flexible member and a return-position portion having a radius decreasing with increase in distance from the second initial-position portion are formed on the inner surface of the second through-hole;

wherein the first flexible member rotates free of the cam member up until its angular displacement equals to an arc length of the first through-hole when an external force equal to or greater than a limit torque of the coupling device is applied to the rotating member.

10. The rotating device as set forth in claim 9, wherein the rotating device is used as a joint of a manipulator.

11. A rotating device comprising:

a rotating member;

a rotating shaft rotated by a driving motor; and a coupling device coupling the rotating shaft and the rotating member, wherein the coupling device comprises:

flexible members that are vertically connected to the rotating shaft having a variable length that can be varied in an inward and outward direction with respect to the rotating shaft;

elastic members that are connected to the flexible members and cause the flexible member to receive an elastic force in the outward direction with respect to the rotating shaft; and a cam member that is rotatably connected to the rotating shaft and delivering a rotating force of the rotating shaft to the rotating member, wherein the cam member is formed with through-holes passing through top and bottom surfaces of the cam member;

wherein the flexible members are respectively inserted into the through-holes of the cam member so that the flexible members abut inner surfaces of the through-holes due to the elastic forces of the elastic members; and wherein initial-position portions configured to position the flexible members at an initial stage, and a displaced-position portion having a constant diameter smaller than the initial-position portion about the rotating shaft are formed on the inner surfaces of the through-holes;

wherein the through-holes of the cam member are formed symmetrically with respect to the rotating shaft; and the flexible members are formed symmetrically with respect to the rotating shaft;

wherein the flexible members rotates free of the cam member up until angular displacements of the flexible members equal an arc length of the displaced-position of the through-holes when an external force equal to or greater than a limit torque of the coupling device is applied to the rotating member.

12. The rotating device as set forth in claim 11, wherein the rotating device is used as a joint of a manipulator.

\* \* \* \* \*